(12) United States Patent
Kupershmidt

(10) Patent No.: US 7,496,064 B2
(45) Date of Patent: Feb. 24, 2009

(54) ULTRA WIDE BAND WIRELESS MEDIUM ACCESS CONTROL METHOD AND A DEVICE FOR APPLYING AN ULTRA WIDE BAND WIRELESS MEDIUM ACCESS CONTROL SCHEME

(75) Inventor: Yefim Kupershmidt, Or Yehuda (IL)

(73) Assignee: Wisair Ltd, Ramot Hachayal ( * ) Notice: Subject to any disclaimer, the term of this patent is extended or adjusted under 35 U.S.C. 154(b) by 758 days.

(21) Appl. No.: 11/043,253

(22) Filed: Jan. 25, 2005

(65) Prior Publication Data

US 2005/0237964 A1     Oct. 27, 2005

Related U.S. Application Data

(63) Continuation of application No. PCT/IL2005/000021, filed on Jan. 6, 2005.

(60) Provisional application No. 60/535,436, filed on Jan. 8, 2004, provisional application No. 60/535,621, filed on Jan. 8, 2004.

(51) Int. Cl.
*H04B 7/212* (2006.01)

(52) U.S. Cl. ...................................................... 370/321

(58) Field of Classification Search ................. 370/310, 370/328, 329, 336, 337, 431, 442, 443, 444, 370/445, 447, 458, 461, 462, 477
See application file for complete search history.

(56) References Cited

U.S. PATENT DOCUMENTS

| | | | |
|---|---|---|---|
| 2007/0104215 A1* | 5/2007 | Wang et al. | 370/458 |
| 2007/0263567 A1* | 11/2007 | Habetha et al. | 370/329 |
| 2007/0286221 A1* | 12/2007 | Wu et al. | 370/412 |
| 2008/0063000 A1* | 3/2008 | Shor et al. | 370/401 |

* cited by examiner

*Primary Examiner*—Edan Orgad
*Assistant Examiner*—Blanche Wong
(74) *Attorney, Agent, or Firm*—Reches Patents

(57) ABSTRACT

A method and device for ultra wide band wireless medium access control, the method includes: assigning a plurality of information frames to at least one DRP queue and to at least one PCA queues; determining whether to re-assign at least one information frame previously assigned to at least one DRP queue to a PCA queue; and re-assigning at least one information frame in response to the determination. A device and method for ultra wide band wireless medium access control, the method includes: assigning a plurality of information frames to at least one DRP queue and to at least one PCA queues; and scheduling a transmission of at least one information frame assigned to at least one DRP queue during at least one PCA transmission period.

14 Claims, 11 Drawing Sheets

ULTRA WIDE BAND WIRELESS MEDIUM ACCESS CONTROL METHOD AND A DEVICE FOR APPLYING AN ULTRA WIDE BAND WIRELESS MEDIUM ACCESS CONTROL SCHEME

RELATED APPLICATIONS

The present patent application is a continuation application of International Application No. PCT/IL05/000021 filed Jan. 6, 2005, which claims priority benefit from U.S. Provisional Application No. 60/535,436 filed Jan. 8, 2004 and U.S. Provisional Application No. 60/535,621 filed Jan. 8, 2004, the contents of which are incorporated herein by reference.

This application is related to the following applications:
1. METHOD AND DEVICES FOR MULTICASTING INFORMATION OVER A NETWORK THAT APPLIED A DISTRIBUTED MEDIA ACCESS CONTROL SCHEME, application Ser. No. 11/043,456, filed Jan. 25, 2005.
2. METHODS AND DEVICES FOR EXPANDING THE RANGE OF A NETWORK, application Ser. No. 11/043,646, filed Jan. 25, 2005.
3. METHOD AND SYSTEM FOR OPERATING MULTIPLE DEPENDENT NETWORKS, application Ser. No. 11/043,457, filed Jan. 25, 2005.
4. A DEVICE AND METHOD FOR MAPPING INFORMATION STREAMS TO MAC LAYER QUEUES, application Ser. No. 11/043,476, filed Jan. 25, 2005.
5. METHOD AND DEVICE FOR TRANSMISSION AND RECEPTION OVER A DISTRIBUTED MEDIA ACCESS CONTROL NETWORK, application Ser. No. 11/043,279, filed Jan. 25, 2005.

FIELD OF THE INVENTION

The invention relates to ultra wide band wireless medium access control schemes.

BACKGROUND TO THE INVENTION

Recent developments in telecommunication and semiconductor technologies facilitate the transfer of growing amounts of information over wireless networks.

Short-range ultra wide band wireless networks are being developed in order to allow wireless transmission of vast amounts of information between various devices. U.S. patent application 2003/0063597 of Suzuki, titled "Wireless transmission system, wireless transmission method, wireless reception method, transmitting apparatus and receiving apparatus", which is incorporated herein by reference, described wireless networks that each includes a base station.

Some of short-range ultra wide band wireless networks are characterized by a distributed architecture in which devices exchange information without being controlled by a central host or a base station.

FIG. 1 is a schematic illustration of two ultra wide band wireless networks (also referred to as personal access networks) 10 and 20, each including multiple devices that wirelessly communicate with each other. First network 10 includes first till third devices A-C 11-13 and the second network 20 includes forth till sixth devices D-F 24-26.

Each of the ultra wide band wireless networks uses time division multiple access (TDMA) techniques in order to allow its devices to share a single channel.

FIG. 2 illustrates a typical TDMA frame 30. TDMA frame 30 includes multiple time-slots, such as beacon slots 14 and media access slots. The media access slots include distributed reservation protocol (DRP) slots 36 and prioritized contention access (PCA) slots 38. PCA slots are also referred to as PCA periods. DRP slots are also referred to as DRP periods.

The beacon slots are used to synchronize devices to the TDMA frame 30. A typical beacon frame includes information that identifies the transmitting device. It also may include timing information representative of the start time of the TDMA frame 30.

The DRP slots 36 are coordinated between devices that belong to the same network and allow devices to reserve these slots in advance. During the PCA slots 38 devices that belong to the network compete for access based upon their transmission priority. It is noted that the allocation of media access time slots is dynamic and can change from one TDMA frame to another.

Typically, the PCA slots are assigned by applying a carrier sense multiple access with collision avoidance (CSMA/CA) scheme. If a device requests to transmit over a wireless medium it has to check if the wireless medium is idle. If the wireless medium is not idle the device has to wait a randomly determined time period. This time period is selected from a contention window that has a length that is inversely proportional to the priority of the device.

Transmission between devices that belong to the first network 10 can be subjected to interferences from devices of the second network. This can occur if, for example, a device of the second network is moved towards the devices of the first network, or if the wireless medium characteristics have changed such as to increase the transmission range of devices of the second network.

FIG. 3 illustrates a TDMA frame 30 of first network 10 as well as a TDMA frame 40 of second network 20. TDMA frame 40 includes multiple time-slots, such as beacon slots 44, DRP slots 46 and PCA slots 48.

TDMA frame 30 and TDMA frame 40 are not aligned to each other. In addition, the partition between various slots differs from the TDMA frame 10 to TDMA frame 40.

The differences between the two TDMA frames can cause transmission failures. These failures can occur PCA slots and even during DRP slots.

The wireless medium can be utilized for transmission of variable-rate streaming applications. Application rates peaks can cause a reduction in the performance of the ultra wide band network, due to network congestion, buffers overflow, timing requirements violations and loss of packets.

There is a need to reduce the effects of inter-network interference. These is also a need to improve the utilization of the wireless medium.

SUMMARY OF THE INVENTION

A method for ultra wide band wireless medium access control in which information frames that were assigned to DRP queues are re-assigned to PCA queues.

A method and device for ultra wide band wireless medium access control, the method includes: (i) assigning a plurality of information frames to one or more DRP queue and to one or more PCA queues; (ii) determining whether to re-assign at least one information frame previously assigned to at least one DRP queue to a PCA queue; and (iii) re-assigning at least one information frame in response to the determination.

A device that includes an ultra wide band wireless medium access control circuitry, whereas the circuitry includes at least one PCA queue, at least one DRP queue, and a controller, adapted to: (i) assign a plurality of information frames to at least one DRP queue and to at least one PCA queues; (ii)

determine whether to re-assign at least one information frame previously assigned to at least one DRP queue to a PCA queue; and (iii) re-assign at least one information frame in response to the determination.

A device and method for ultra wide band wireless medium access control, the method includes: (i) assigning a plurality of information frames to at least one DRP queue and to at least one PCA queues; and (ii) scheduling a transmission of at least one information frame assigned to at least one DRP queue during at least one PCA transmission period.

A computer readable medium having code embodied therein for causing an electronic device to perform the stages of: assigning a plurality of information frames to at least one DRP queue and to at least one PCA queues; determining whether to re-assign at least one information frame previously assigned to at least one DRP queue to a PCA queue; and re-assigning at least one information frame in response to the determination.

A computer readable medium having code embodied therein for causing an electronic device to perform the stages of: assigning a plurality of information frames to at least one DRP queue and to at least one PCA queues; and scheduling a transmission of at least one information frame assigned to at least one DRP queue during at least one PCA transmission period.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

The invention provides an ultra wide band wireless medium access control method and a device capable of performing ultra wide band wireless medium access control schemes.

Conveniently, the device is a part of a ultra wideband wireless network and has a communication protocol stack that includes at least a PHY layer and a MAC layer. The MAC layer of such devices controls the access to ultra wide band wireless medium and is referred to ultra wide band wireless medium access control.

Examples of devices that have a PHY layer are illustrated in the following U.S. patent applications, all being incorporated herein by reference: U.S. patent application Ser. No. 10/389,789 filed on Mar. 10, 2003 and U.S. patent application Ser. No. 10/603,372 filed on Jun. 25, 2003.

The receiver can include various components that are arranged in multiple layers. A first configuration includes a frame convergence sub-layer, a MAC layer, a PHY layer as well as MAC SAP, PHY SAP, frame convergence sub-layer SAP and a device management entity can also be utilized. Another configuration is described at FIGS. 4a and 4b.

Wisair Inc. of Tel Aviv Israel manufactures a chip set that includes a Radio Frequency PHY layer chip and a Base-Band PHY layer chip. These chips can be connected in one end to a RF antenna and on the other hand be connected or may include a MAC layer circuitry.

Figure 1:
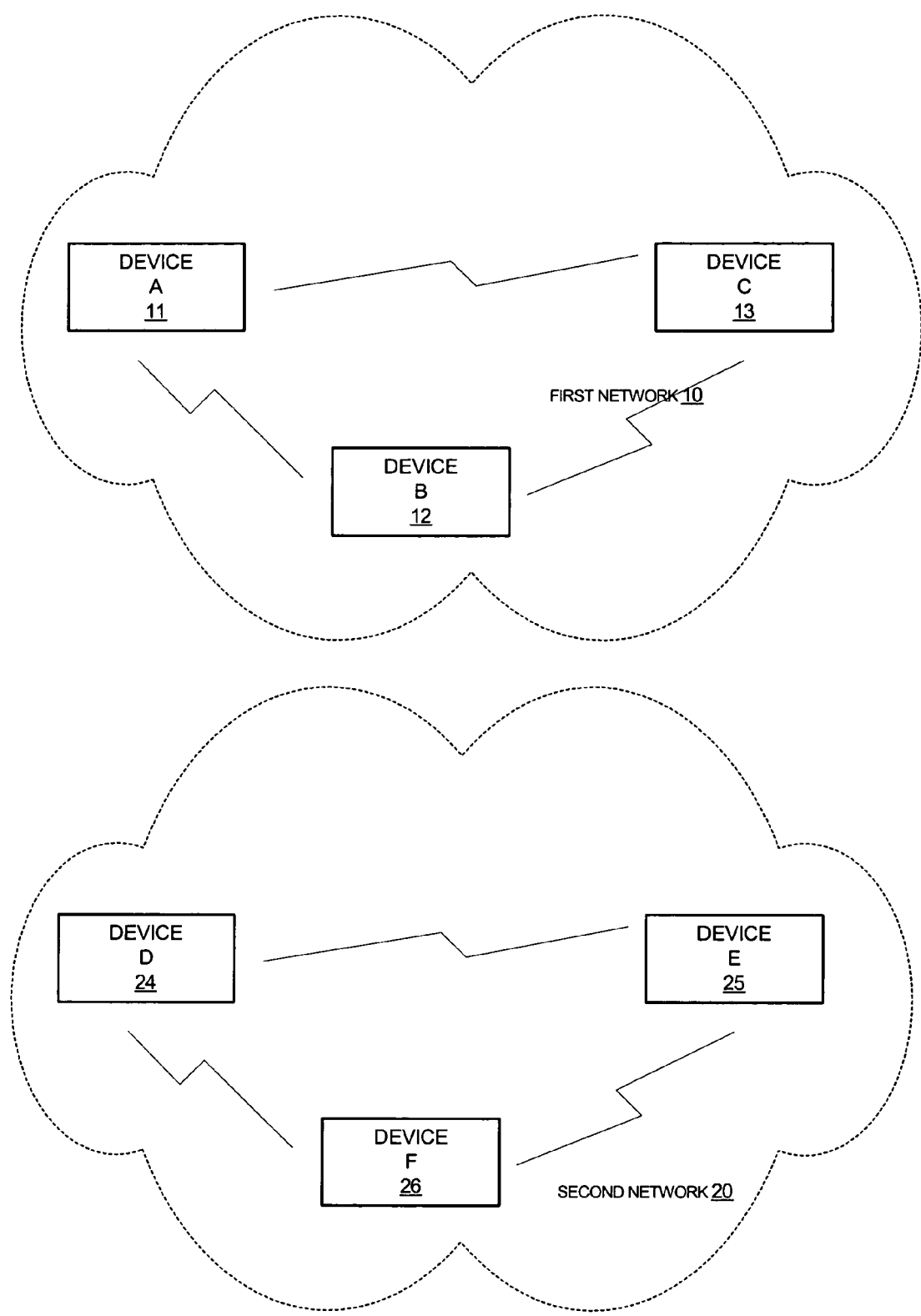
FIG. 1 is a schematic illustration of two networks (also referred to as personal access networks), each including multiple devices that wirelessly conmmunicate with each other.
Figure 2:
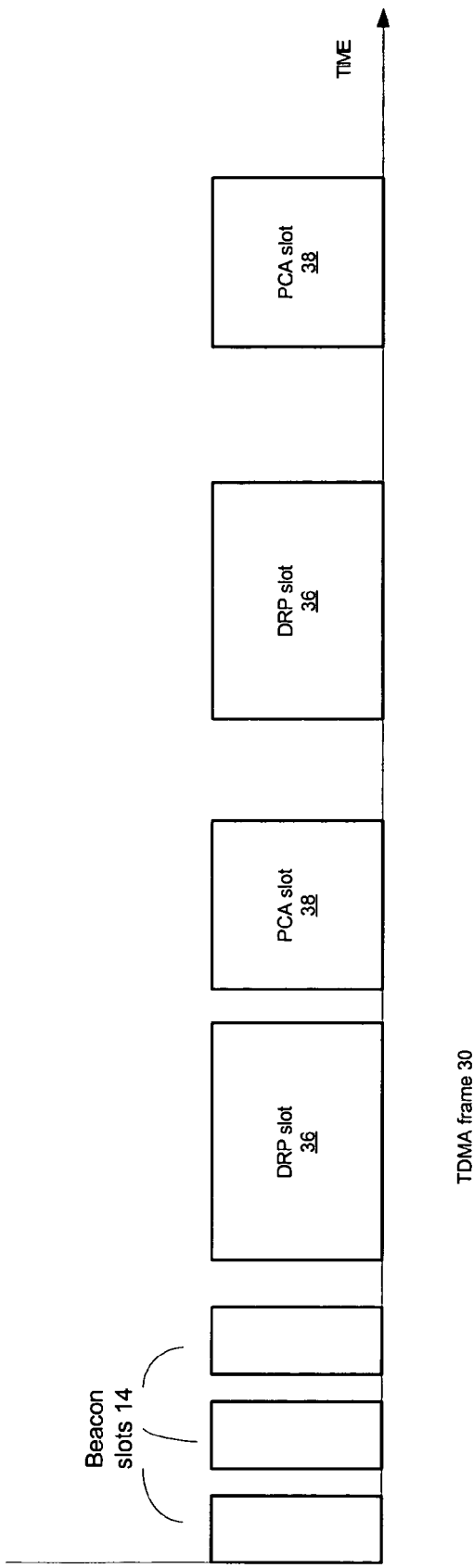
FIG. 2 illustrates a typical TDMA frame.
Figure 3:
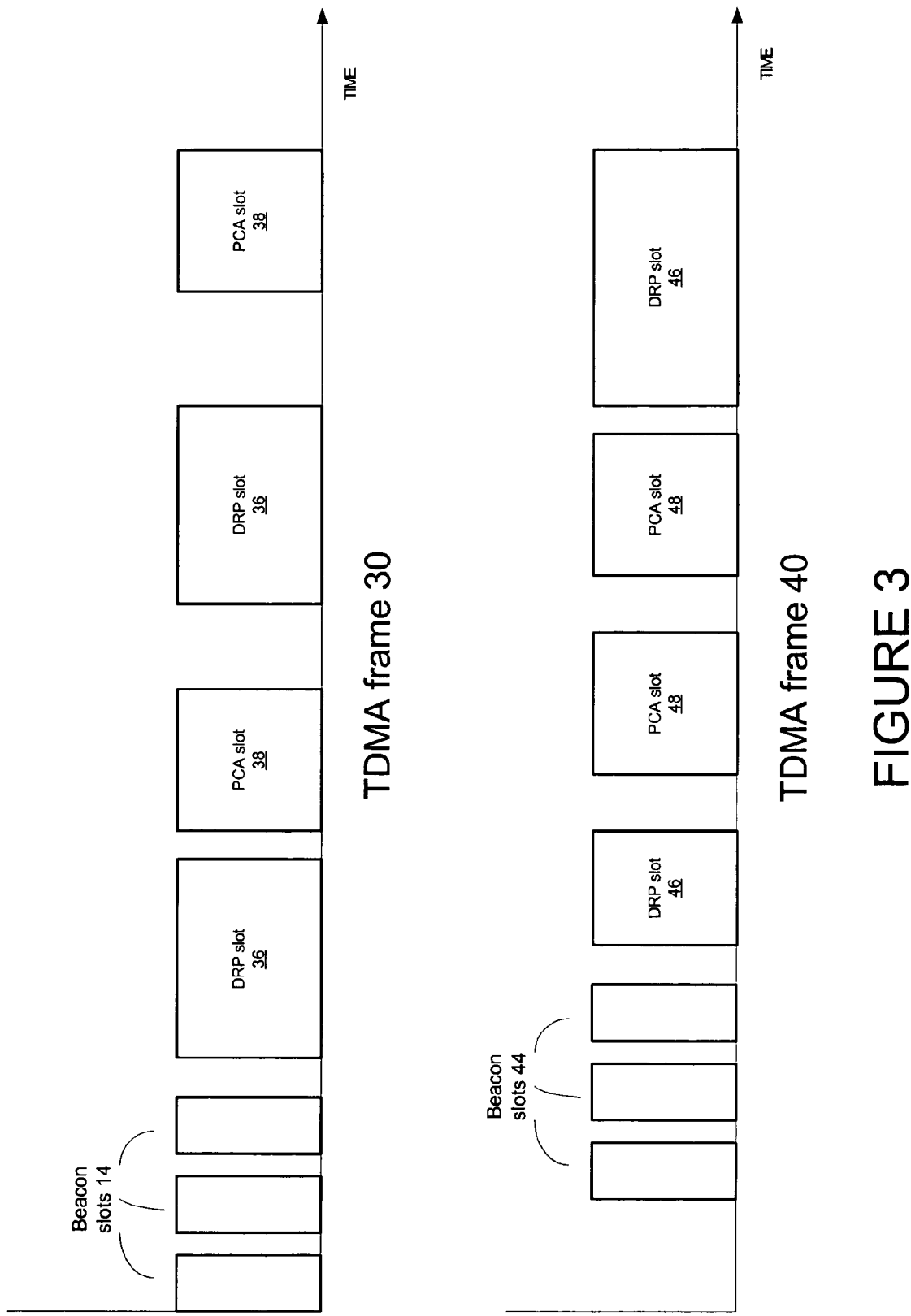
FIG. 3 illustrates a TDMA frame of first network as well as a TDMA frame of a second network.
Figure 4A:
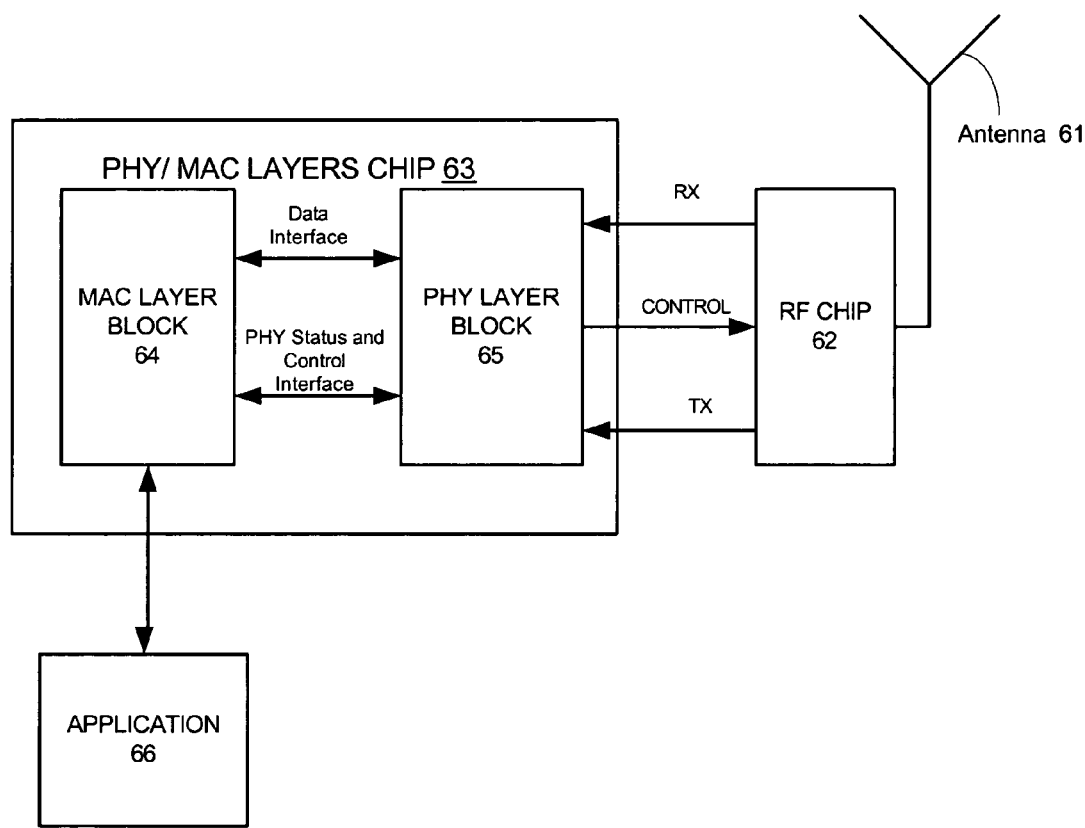
FIGS. 4a-4b illustrate a device capable of wireless transmission, and some of its components, according to an embodiment of the invention.

FIG. 4a illustrates a device 60 that is capable of wireless transmission, according to an embodiment of the invention.

Device 60 includes antenna 61 that is connected to a RF chip 62. RF chip 62 is connected to a MAC/PHY layers chip 63 that includes a PHY layer block 63 and a MAC layer block 64. The MAC/PHY layers chip 63 is connected to an application entity 66 that provides it with information to be eventually transmitted (TX) and also provides the application 66 with information received (RX) by antenna 61 and processed by PHY and MAC layers blocks 68 and 69 of FIG. 4b.

Typically, the MAC layer block 64 controls the PHY layer block using a PHY status and control interface. The MAC and PHY layers exchange information (denoted TX and RX) using PHY-MAC interface 90. The RF chip 62 provides to the PHY layer block 63 received information that is conveniently down-converted to base band frequency. The RF chip 62 receives from the PHY layer block 63 information to be transmitted as well as RF control signals. The application 66 is connected to the MAC/PHY layers chip 63 by a high speed I/O interface.

Figure 4B:
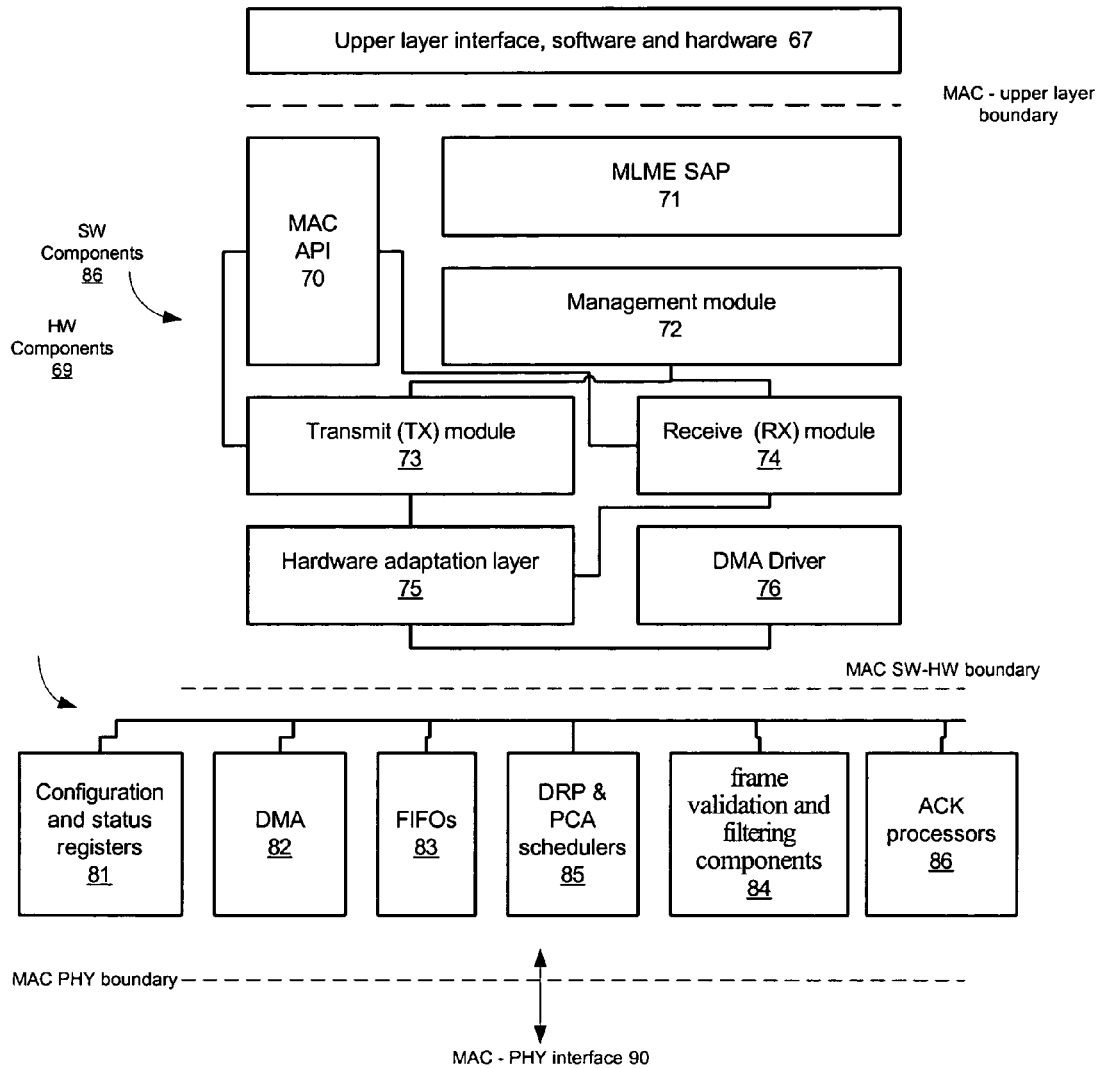

FIG. 4b illustrates various hardware and software components of the MAC/PHY layers chip 63, according to an embodiment of the invention.

The Upper Layer IF block 64 of the MAC/PHY layers chip 63 includes hardware components (collectively denoted 69) and software components (collectively denoted 68). These components include interfaces to the PHY layer (MAC-PHY interface 90) and to the application (or higher layer components).

The hardware components 69 include configuration and status registers 81, Direct Memory Access controller 82, First In First Out (FIFO) stacks 83 and frame validation and filtering components 84, DRP and PCA slots schedulers 85, ACK processors 86, and MAC-PHY internal interface 87.

The software components 68 include a management module 72, transmit module 73, receive module 74m hardware adaptation layer 75, DMA drivers 76, MAC layer management entity (MLME) service access point (SAP) 71, MACS API 70 and the like.

These software and hardware components are capable of performing various operations and provide various services such as: providing an interface to various layers, filtering and routing of specific application packets sent to MAC data queues or provided by these queues, performing information and/or frame processing, and the like.

The routing can be responsive to various parameters such as the destinations of the packets, the Quality of Service characteristics associated with the packets, and the like.

The processing of information along a transmission path may include: forming the MAC packet itself, including MAC header formation, aggregation of packets into a bigger PHY PDU for better efficiency, fragmentation of packets for better error rate performance, PHY rate adaptation, implementation of Acknowledgements policies, and the like.

The processing of information along a reception path may include de-aggregation and/or de-fragmentation of incoming packets, implementation of acknowledgment and the like.

The hardware components are capable of transferring data between MAC software queues and MAC hardware (both TX and RX), scheduling of beacons slots, scheduling of DRP and PCA access slots, validation and filtering (according to destination address) of incoming frames, encryption/decryption operations, low-level acknowledgement processing (both in the TX path and in the RX path), Device 60 can be a simple device or even a complex device such as but not limited to a multimedia server that is adapted to transmit information frames of different types to multiple devices. It can, for example transmit Streaming data, like voice, Video, Game applications, etc.) data files during DRP slots, and while PCA slots transmits video over IP frames, download MP3 files, download MPEG-2 files, and stream or download MPEG4 streams.

Usually, voice frames are associated with higher quality of service requirements and accordingly are given higher transmission priorities. The voice frames QoS requirements are followed by video frames that in turn are followed by lower quality of service requirements (lower priority transmission) frames such as best effort frames and background frames.

Figure 5:
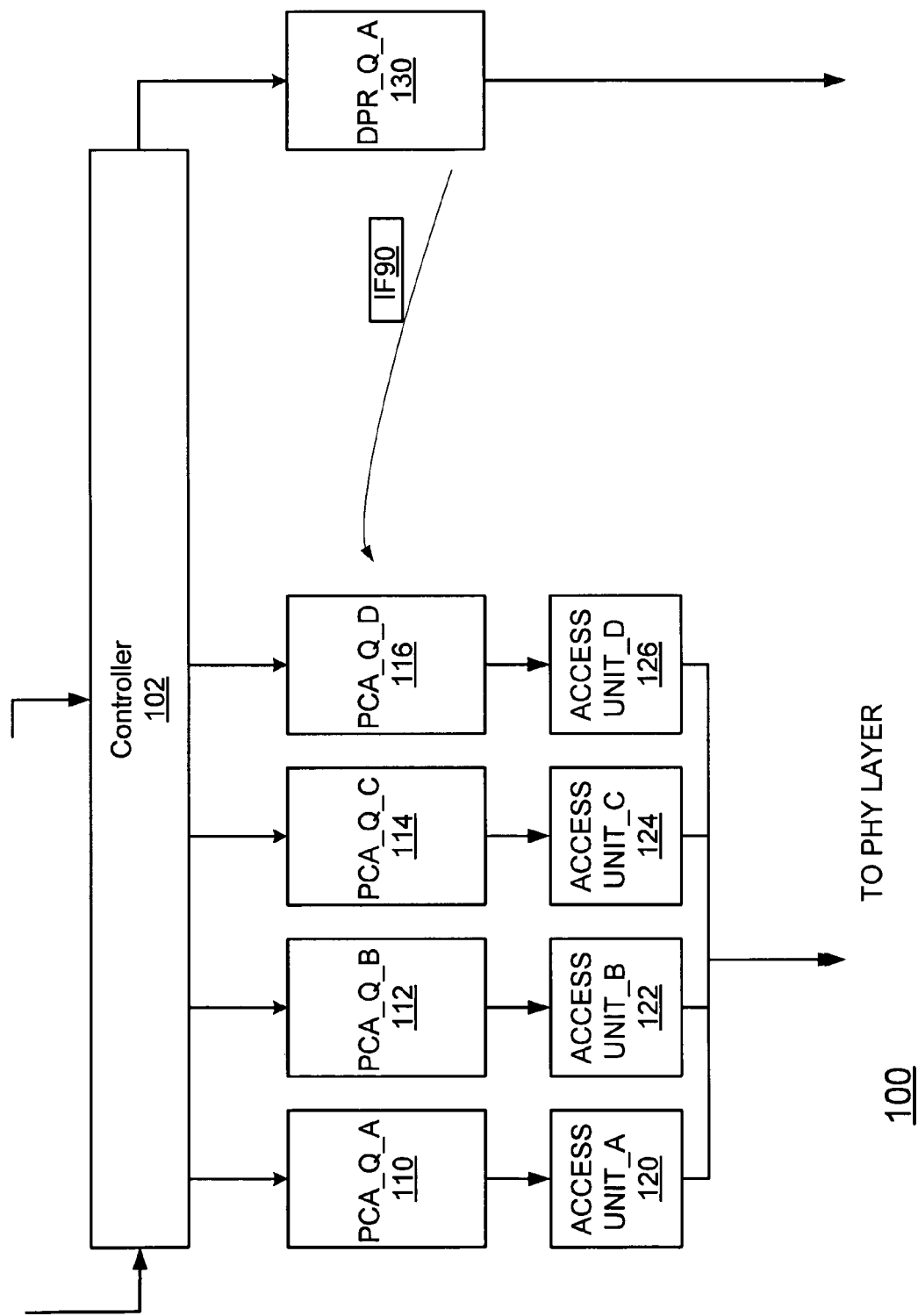
FIGS. 5-8 illustrate media access control queues management circuitries, according to various embodiments of the invention.

FIG. 5 illustrates a media access control circuitry 100, according to an embodiment of the invention.

The media access control circuitry 100 includes a controller 102, four PCA queues PCA_Q_A-PCA_Q_D 110-116, four access units ACCESS UNIT_A-ACCESS UNIT_D 120-126 and a DRP queue DRP_Q_A 130.

It is assumed that each of the four PCA queues has a different transmission priority, whereas PCA_Q_A 110 has the highest priority and PCA_Q_D 116 has the lowest transmission priority. These priorities are referred to as PCA transmission priorities.

The controller 102 (also referred to as mapper 102) assigns information frames provided by various applications to the PCA and DRP queues 110-116 and 130, according to the type of application, and the like. Typically, DRP slots are used to convey isochronous traffic while PCA slots are used to convey asynchronous traffic.

The four PCA queues 110-116 are connected to four access units 120-126 that apply a CSMA/CA scheme to schedule the transmission of information frames from these queues. The information frames are sent to the PHY layer that in turn generates and transmits electromagnetic signals representative of these information frames.

The CSMA/CA scheme with differential access parameters is responsive for the PCA transmission priorities of the different PCA queues.

According to an embodiment of the invention, the DRP queue DRP_Q_A 130 sends one or more information frames, such as IF 90, to one or more of the PCA queues, such as PCA_Q_D 116. The receiving PCA queue can be selected in response to its PCA transmission priority, but this is not necessarily so. Conveniently, the selected PCA queue and the DRP queue have the same transmission priority.

By re-assigning a previously DRP assigned information packet to a PCA queue, the circuitry allows that information frame to be sent during a PCA periods.

According to an embodiment of the invention the information frame that was originally assigned to a DRP queue and then re-assigned to a PCA queue can be re-assigned to the DRP queue if certain conditions occur. For example—if it was not successfully transmitted prior to the next coming DRP period serving the specific DRP queue.

According to an embodiment of the invention the controller 102 or another component, such as a controller (not shown) can determine whether to re-assign a DRP packet to a PCA queue in response to various indications that can reflect a DRP transmission problem. These indications can include a predefined amount (or percentage) of failed transmissions (can be learnt when applying an Acknowledge-based transmission scheme), DRP queues fullness (for example—overflow), validity of queued information frames (for example—time stamps of time sensitive information frames are going to expire).

According to another embodiment of the invention the re-assignment is responsive to momentary peaks of a variable rate streaming application. In such a case the average rate traffic of such application can be sent during DRP slots while peak traffic is also conveyed during PCA slots. Conveniently, the re-assignment can be done before it causes a streaming data traffic hit.

The re-assignment of DRP packets can be applied during a limited amount of PCA periods, a limited amount of TDMA frames and the like. Conveniently, if DRP transmissions are interrupted during more than a predefined amount of TDMA frames or during more than a predefined amount of DRP slots, the device can initiate a listening sequence for determining the cause for transmission failures. Said sequence may cause the devices of a certain network to re-arrange and time-shift their TDMA frame.

Figure 6:
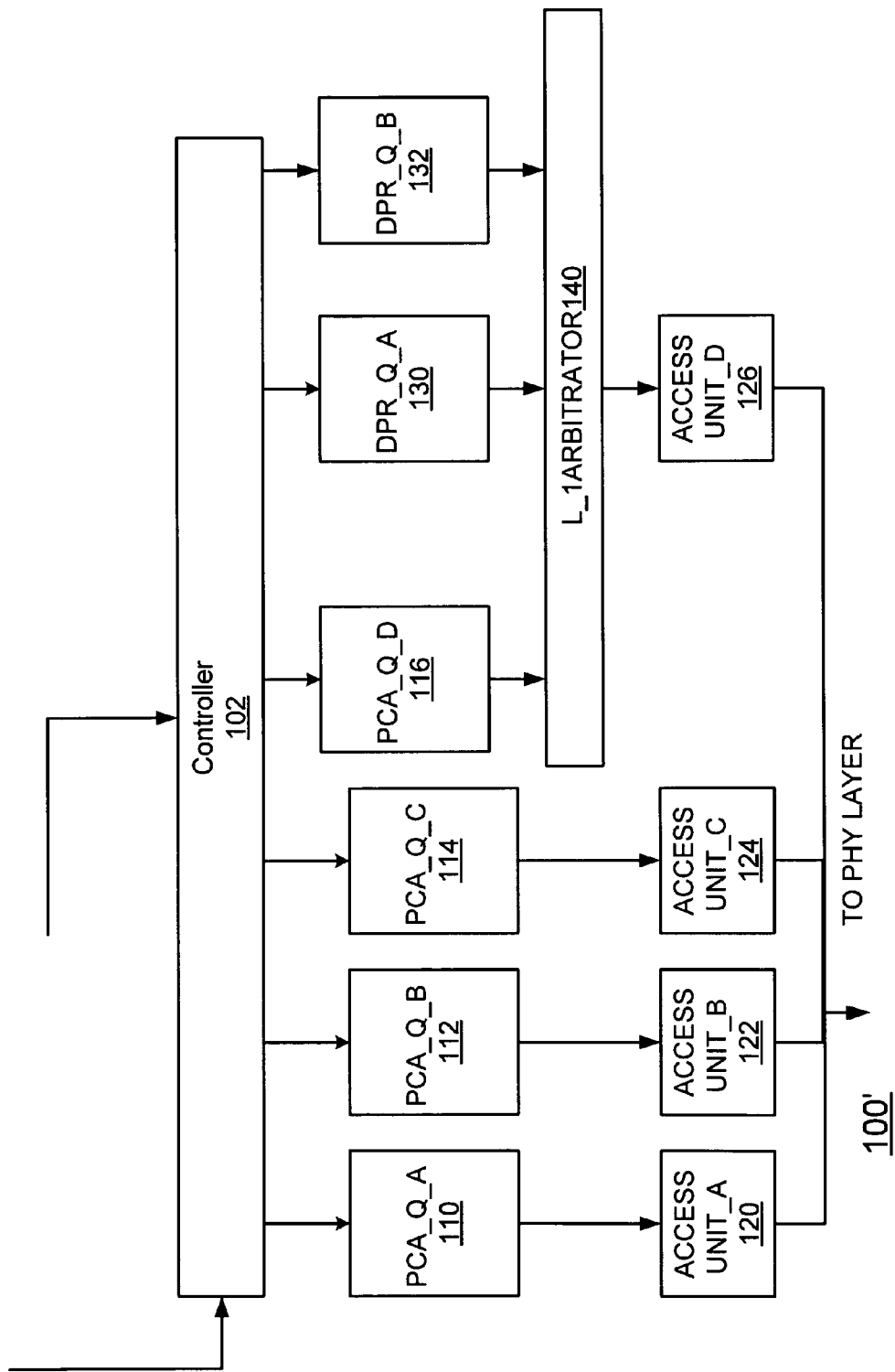

FIG. 6 illustrates a media access control circuitry 100', according to another embodiment of the invention.

FIG. 6 illustrates a circuitry in which two DRP queues are defined, at least during one PCA period as PCA queues. In other words, DRP queues are assigned a certain priority and compete against/share with one or more PCA queues the right to send an information frame to the PHY layer.

Media access control circuitry 100' includes controller 102, four PCA queues PCA_Q_A-PCA_Q_D 110-116, four access units ACCESS UNIT_A-ACCESS UNIT_D 120-126, DRP queues DRP_Q_A 130 and DRP_Q_B 132 and an arbitrator 140.

The two DRP queues 130 and 132 as well as the fourth PCA queue PCA_Q_D 116 are connected to the arbitrator 140. Arbitrator 140 arbitrates between these queues according to various well-known arbitration algorithms. The inventors used a round robin algorithm and alternatively used a weighted round robin algorithm, but other arbitration algorithms can be applied. Conveniently, the weight assigned to each queue reflects its transmission priority and/or the expected traffic throughput and/or buffer sizes of the respective queues.

The selected queue is connected to the fourth access unit 126 that competes with the other access units 120-124 to schedule the transmission of information frames by applying a well-known algorithm such as a CSMA/CA scheme.

Figure 7:
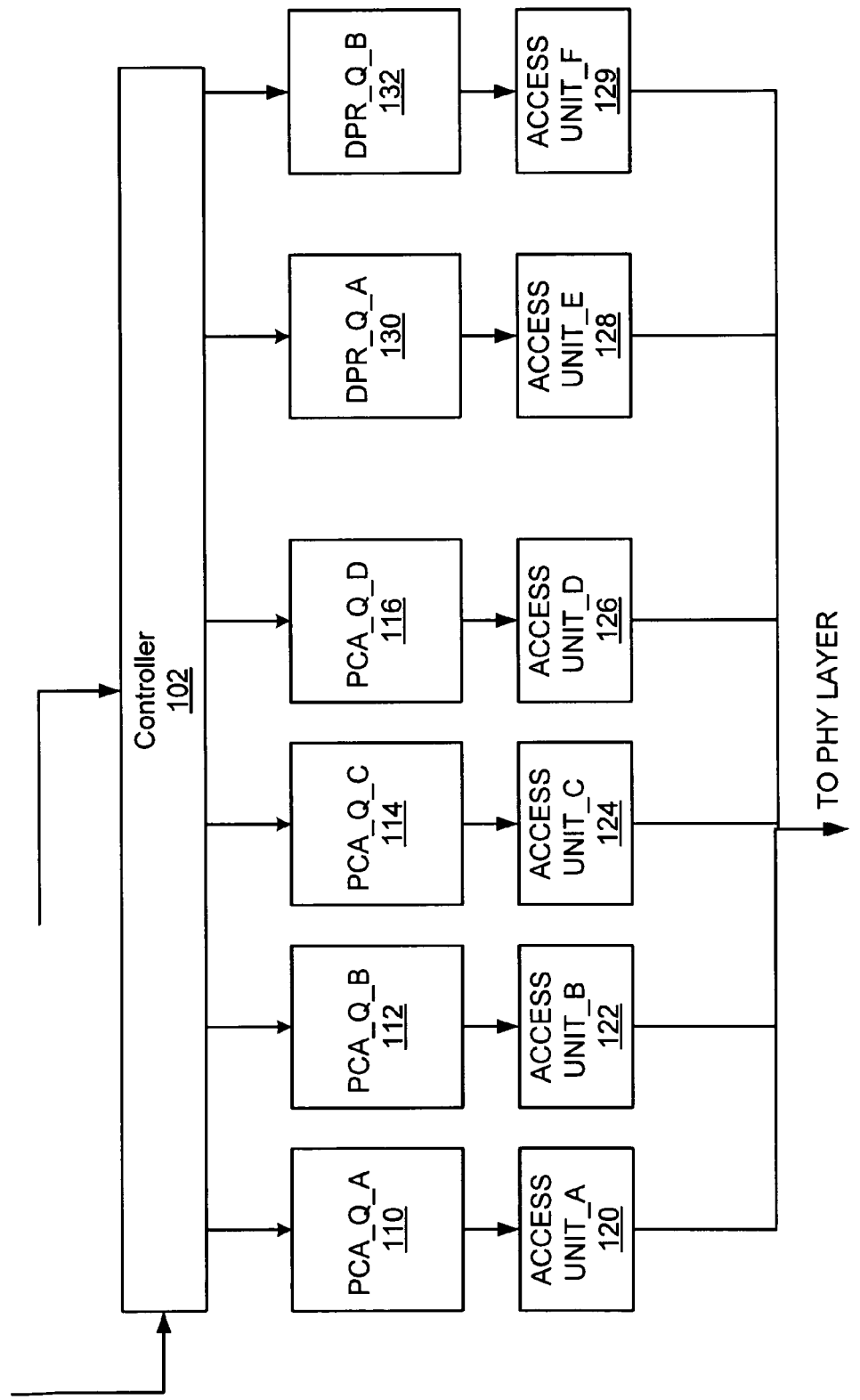

FIG. 7 illustrates a media access control circuitry 100", according to a further embodiment of the invention.

Circuitry 100" refers to each of the DRP queues as a PCA queue that has a certain PCA transmission priority. Each of the PCA and DRP queues participate in a CSMA/CA scheme that is responsive to the transmission priority associated with each PCA or DRP queue. The DRP queues can be assigned a PCA transmission priority that can reflect their DRP priority.

Circuitry 100" includes controller 102 that is connected to the PCA queues 110-116 and to DRP queues 130 and 132. Each of said queues is connected to an access unit out of access units 120-129. DRP queue 130 is connected to ACCESS_UNIT_E 128 and DRP queue 132 is connected to ACCESS_UNIT_F 129.

Figure 8:
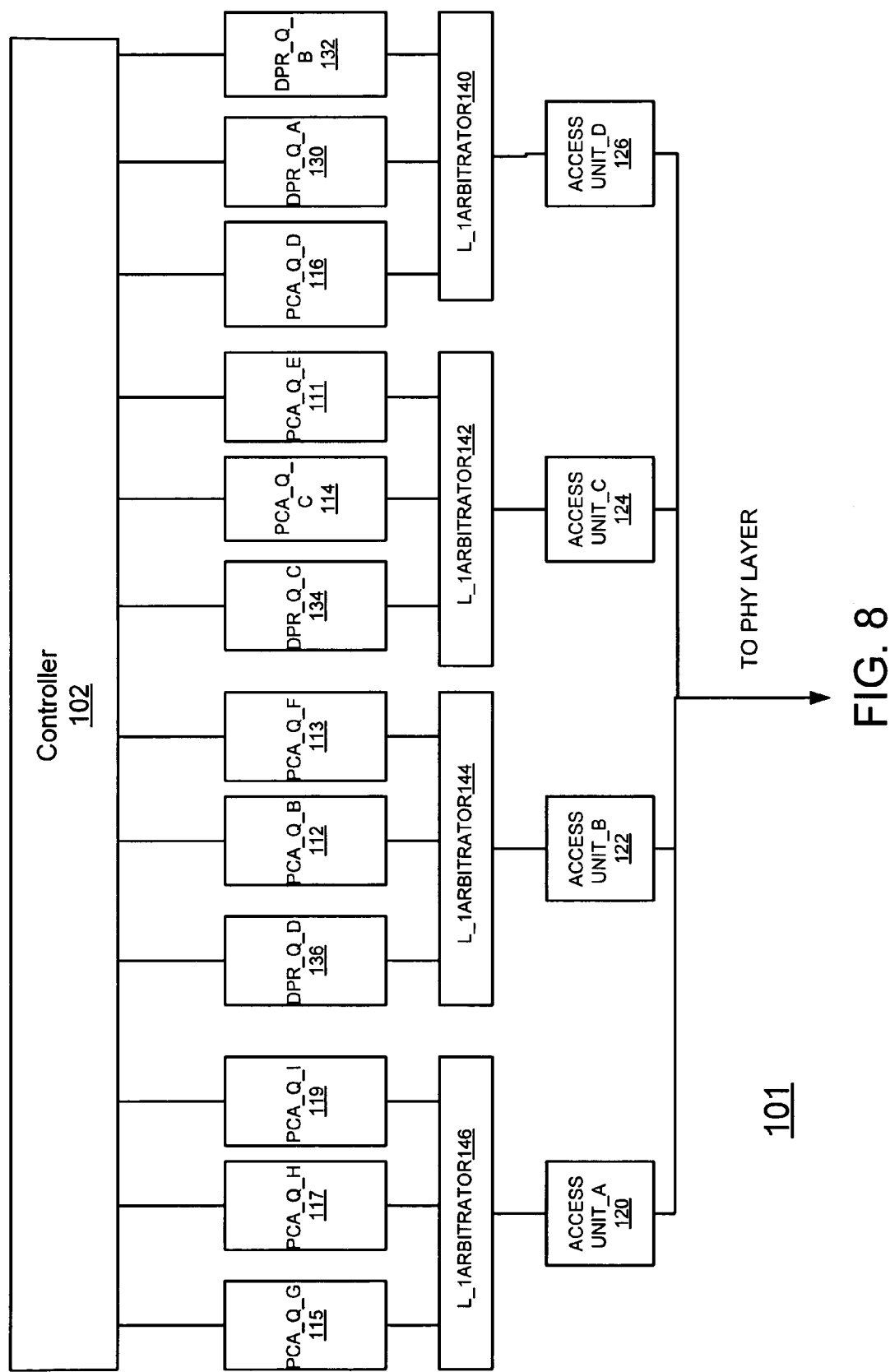

FIG. 8 illustrates a media access control circuitry 101, according to another embodiment of the invention.

The media access circuitry 101 differs from the media access circuitry 100' of FIG. 6 by having more queue and also includes multiple arbitrators for arbitrating between multiple queues that have the same transmission priority. Each arbitrator out of arbitrators 140-146 is connected to a corresponding access unit out of units 120-126.

Arbitrator 146 is connected to three PCA queues 115-119 that have the same PCA transmission priority. Arbitrator 144 is connected to two PCA queues 112 and 113 and a DRP queue 136 that have the same PCA transmission priority. Arbitrator 142 is connected to two PCA queues 111 and 114 and DRP queue 134 that have the same PCA transmission priority. Arbitrator 140 is connected to PCA queue 116 and two DRR queues 130 and 132 that have the same PCA transmission priority. Each of the arbitrators can apply a well-known arbitration scheme. The four access units 120-126 apply another well-known scheduling scheme such as CSMA/CA.

Figure 9:
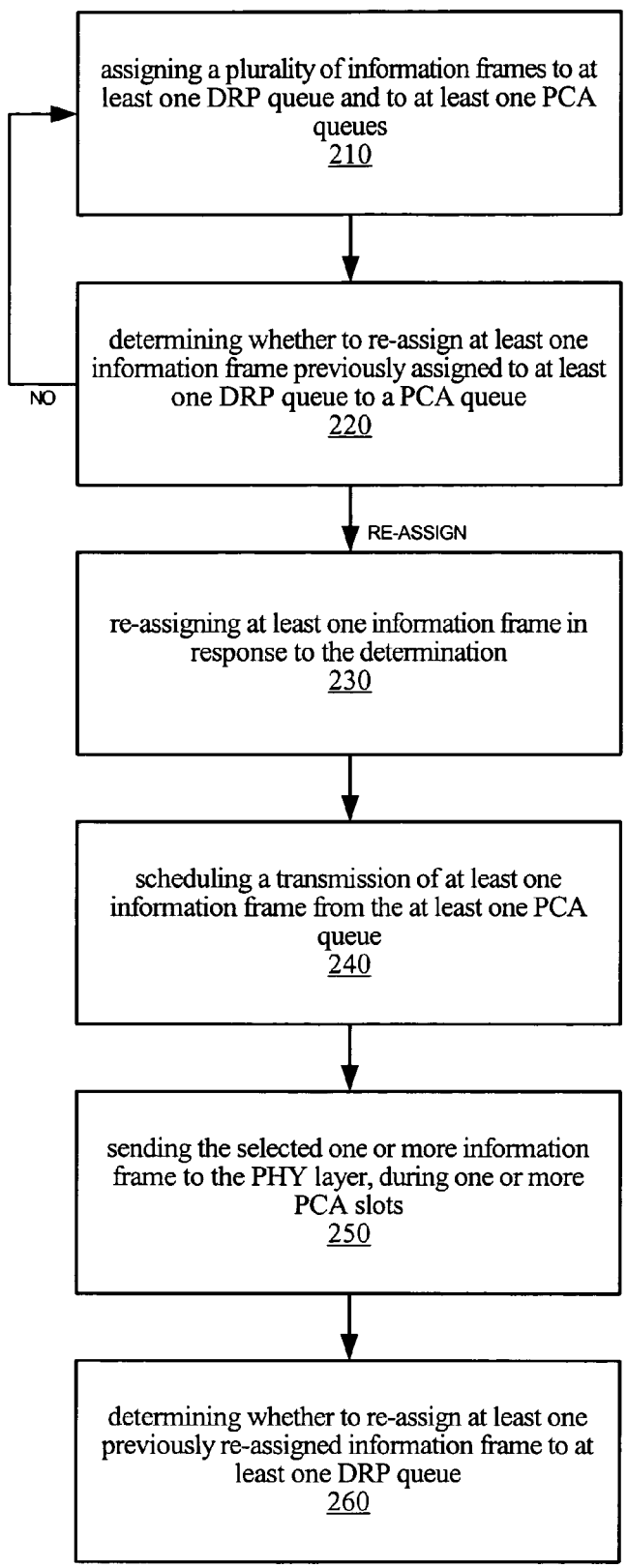
FIGS. 9-10 are flow charts of methods of ultra wide band wireless medium access control, according to various embodiments of the invention.

FIG. 9 is a flow chart of method 200 of ultra wide band wireless medium access control, according to an embodiment of the invention.

Method 200 starts by stage 210 of assigning a plurality of information frames to at least one DRP queue and to at least one PCA queues. Referring to the example set forth in FIG. 5, Controller 102 assigns multiple information frames to PCA queues 110-116 and to DRP queue 130 according to predefined rules.

Stage 210 is followed by stage 220 of determining whether to re-assign at least one information frame previously assigned to at least one DRP queue to a PCA queue. Conveniently, the determining is responsive to transmission failures, to the status of one or more queue or even to a status of information frames within one or more queue, to a variable rate application and especially to transmission peaks of such an application, and the like. Referring to the example set forth in FIG. 5, controller 102 or another entity can determine to re-assign one or more information frames stored within a DRP queue 130 to one or more PCA queue.

Stage 220 is followed by stage 230 of re-assigning at least one information frame in response to the determination. According to an embodiment of the invention, the reassigning comprises defining at least one DRP queue as a PCA queue. Referring to the example set forth in FIG. 5, the information packet IF 90 is sent to PCA queue 116.

Stage 230 is followed by stage 240 of scheduling a transmission of at least one information frame from the at least one PCA queue. Conveniently, each of the at least one PCA queue is associated with a PCA transmission priority, and the scheduling is responsive to the PCA transmission priority. Referring to the example set forth in FIG. 5, the access units 120-126 apply a well-known scheduling scheme, such as CSMA/CA, to determine when information frames positioned at the bottom of each PCA queue is provided to the PHY layer.

According to an embodiment of the invention at least two PCA queue are associated with the same PCA transmission priority and whereas the scheduling comprises selecting between said at least two PCA queue. Conveniently, the selecting involves applying a round robin algorithm or a weighted round robin algorithm. For example, an arbitrator such as arbitrator 146 of FIG. 8 can arbitrate between PCA queues of the same PCA transmission priority. It is noted that FIG. 8 does not illustrate a provision of an information frame from a DRP queue to a PCA queue but it can be modified to allow said provision. It is further noted that method 200 can be applied by a circuitry that includes multiple PCA queues, some having the same PCA transmission priority and which allows the transfer of one or more information queue from a DPR queue to one or more PCA queue.

Stage 240 may be followed by stage 250 of sending the selected one or more information frame to the PHY layer, during one or more PCA slots. This stage can include applying an acknowledge-based transmissions scheme in which the reception of one or more frames is followed by a transmission of an acknowledgement signal.

Stage 250 can be followed by various stages of transmitting information frames during DRP slots. During the DRP slots the DRP queues provide the PHY layer with information frames that are then wirelessly transmitted to other peer members of a wireless ultra wideband network. For simplicity of explanation these stages are not shown. Stage 250 can be followed by any of stages 210 (if new information frames are received), 230, 240 or even stage 260.

Stage 260 includes determining whether to re-assign at least one previously re-assigned information frame to at least one DRP queue. Conveniently, the determination is responsive to time elapsed from stage 230 of re-assigning. According to another embodiment of the invention the determination is responsive to transmission scheduling of at least one re-assigned information frame.

Figure 10:
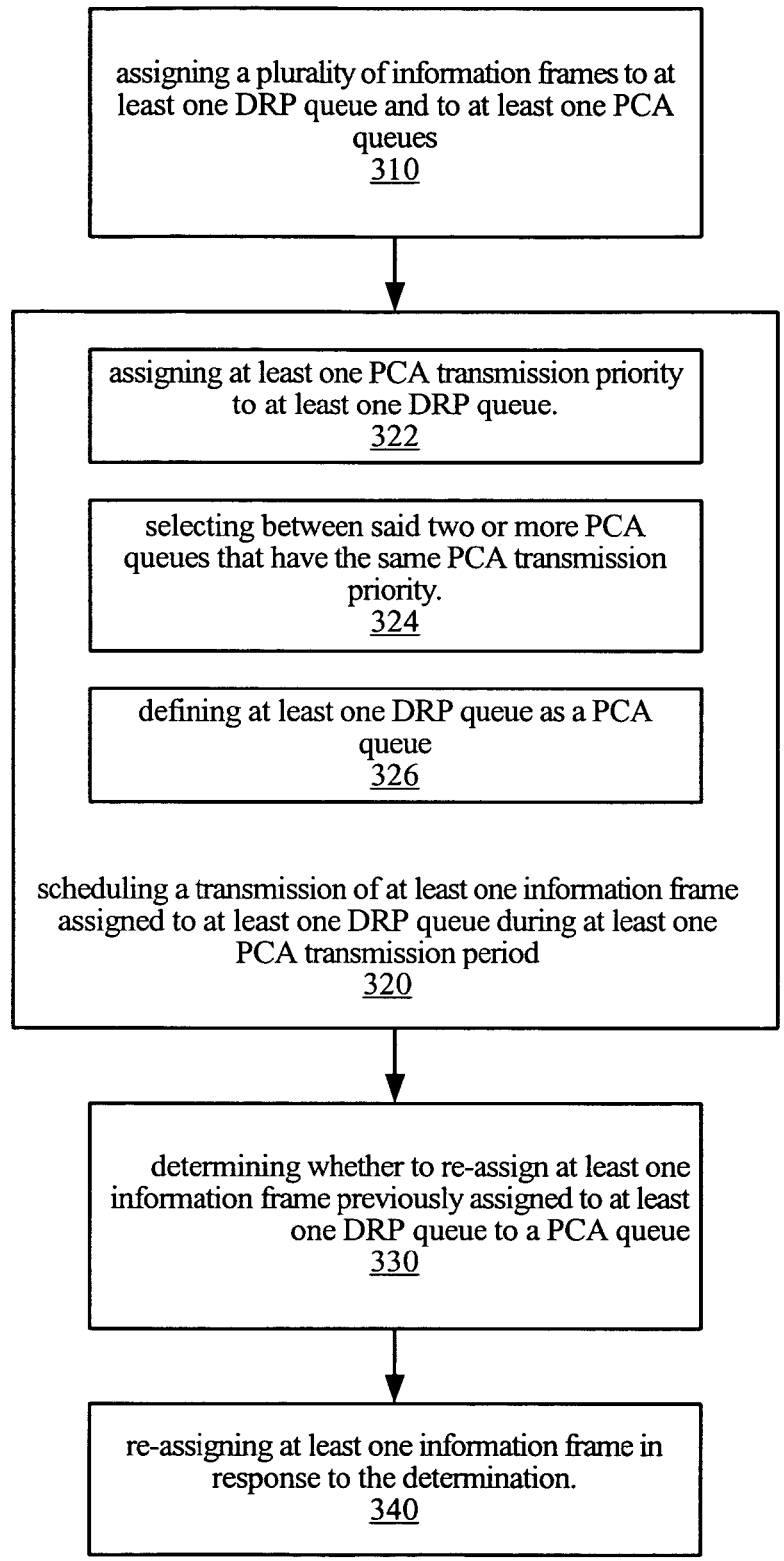

FIG. 10 illustrates method 300 for ultra wide band wireless medium access control, according to an embodiment of the invention.

Method 300 starts by stage 310 of assigning a plurality of information frames to at least one DRP queue and to at least one PCA queues. Referring to the example set forth in any of FIGS. 6-8, controller 102 or another entity assigns information packets to queues according to predefined rules.

Stage 310 is followed by stage 320 of scheduling a transmission of at least one information frame assigned to at least one DRP queue during at least one PCA transmission period. Referring to the examples set forth in any of FIGS. 6-8 the scheduling includes allowing at least one DRP queue to participate in an scheduling scheme and optionally also participate in an arbitration scheme that also involve PCA queues. In other words, the DRP queues are at least temporarily treated as PCA queues.

According to various embodiments of the invention stage 320 includes one or more of stages 322, 324 and 326.

Stage 322 includes assigning at least one PCA transmission priority to at least one DRP queue. Conveniently, the one or more assigned PCA transmission priority is responsive to one or more DRP transmission priorities of the one or more DRP queues.

Stage 324 includes selecting between said two or more PCA queues that have the same PCA transmission priority. Conveniently, the selection involves applying a round robin algorithm or a weighted round robin algorithm.

Stage 326 includes defining at least one DRP queue as a PCA queue.

Stage 320 is conveniently followed by stage 330 of determining whether to re-assign at least one information frame previously assigned to at least one DRP queue to a PCA queue.

Stage 330 is followed by stage 340 of re-assigning at least one information frame in response to the determination.

Stage 340 can be followed by stages such as stage 250 as well y various stages of transmitting information frames during DRP slots, transmitting beacon frames and also idle frames.

It will be apparent to those skilled in the art that the disclosed subject matter may be modified in numerous ways and may assume many embodiments other then the preferred form specifically set out and described above. For example, the amount of access units can differ from the amount of queues, the amount of queues and the amount of transmission priorities can vary. It is noted that each of the mentioned above circuitries can be applied by hardware, software, middleware or a combination of the above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

I claim:

1. A method for ultra wide band wireless medium access control, the method comprises:
    assigning a plurality of information frames to at least one distributed reservation protocol (DRP) queue and to at least one and prioritized contention access (PCA) queues; and
    scheduling a transmission of at least one information frame assigned to at least one DRP queue during at least one PCA transmission period.

2. The method of claim 1 whereas the stage of scheduling comprises determining whether to re-assign at least one information frame previously assigned to at least one DRP queue to a PCA queue; and re-assigning at least one information frame in response to the determination.

3. The method of claim 1 whereas at least two PCA queues are associated with the same PCA transmission priority and whereas the scheduling comprises selecting between said at least two PCA queue.

4. The method of claim 3 whereas the selecting comprises applying a round robin algorithm or a weighted round robin algorithm.

5. The method of claim 1 whereas the stage of scheduling comprises defining at least one DRP queue as a PCA queue.

6. The method of claim 1 further comprising determining whether to re-assign at least one previously re-assigned information frame to at least one DRP queue.

7. A device comprising a ultra wide band wireless medium access control circuitry, whereas the circuitry comprises: at least one prioritized contention access (PCA) queue, at least one distributed reservation protocol (DRP) queue, and a controller, whereas the controller is adapted to: (i) assign a plurality of information frames to at least one DRP queue and to at least one PCA queues; and (ii) schedule a transmission of at least one information frame assigned to at least one DRP queue during at least one PCA transmission period.

8. The device of claim 7 further adapted to assign at least one PCA transmission priority to the at least one DRP queues.

9. The device of claim 8 whereas the at least one PCA transmission priority are responsive to the DRP transmission priorities of the at least one DRP queue.

10. The device of claim 7 whereas the device is adapted to determine whether to re-assign at least one information frame previously assigned to at least one DRP queue to a PCA queue; and further adapted to re-assign at least one information frame in response to the determination.

11. The device of claim 7 whereas at least two PCA queues are associated with the same PCA transmission priority and whereas the device is adapted to select between said at least two PCA queues.

12. The device of claim 11 whereas the selection comprises applying a round robin algorithm or a weighted round robin algorithm.

13. The device of claim 7 further adapted to define at least one DRP queue as a PCA queue.

14. The device of claim 7 further adapted to determine whether to re-assign at least one previously re-assigned information frame to at least one DRP queue.

* * * * *